United States Patent

[15] 3,686,852

Ingram et al.

[45] Aug. 29, 1972

[54] ALARM DEVICE UTILIZING FISHING REEL RATCHET MECHANISM

[72] Inventors: Clarence E. Ingram; Louis T. Warriner, both of 777 N. Park Ave., Apt. 3, Pomona, Calif. 91767

[22] Filed: April 1, 1971

[21] Appl. No.: 130,393

[52] U.S. Cl..................................58/21.15, 58/54
[51] Int. Cl.......................G04b 11/00, G04b 37/00
[58] Field of Search..........58/16, 21.15, 21.16, 52–54

[56] References Cited

UNITED STATES PATENTS 2,924,067   2/1960   Midgley et al. ........58/21.15 X
990,573     4/1911   Lux.......................58/21.15 X

*Primary Examiner*—Richard B. Wilkinson
*Assistant Examiner*—Lawrence R. Franklin
*Attorney*—Clarence A. O'Brien and Harvey B. Jacobson

[57] ABSTRACT

An alarm clock device is provided which produces an alarm signal similar to that of a fishing reel when a fish takes the hook and unwinds the line from the reel. The clock is comprised of a conventional clock mechanism mated with an alarm mechanism which includes a fishing reel clicking ratchet mechanism to produce a clicking like sound when the alarm goes off.

4 Claims, 5 Drawing Figures

PATENTED AUG 29 1972

Clarence E. Ingram
Louis T. Warriner
INVENTORS

BY Clarence A. O'Brien
and Harvey B. Jacobson
Attorney

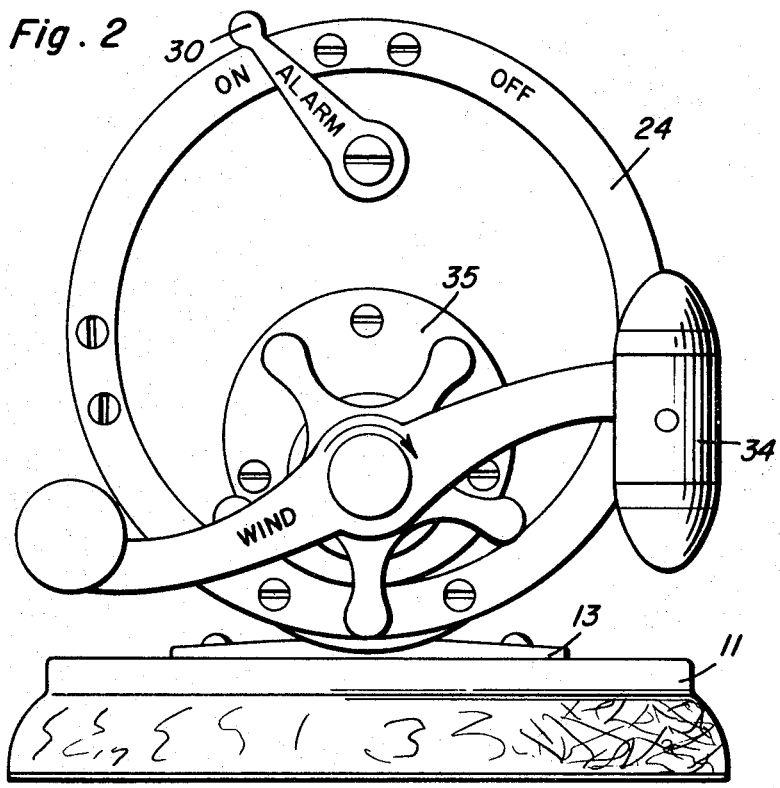
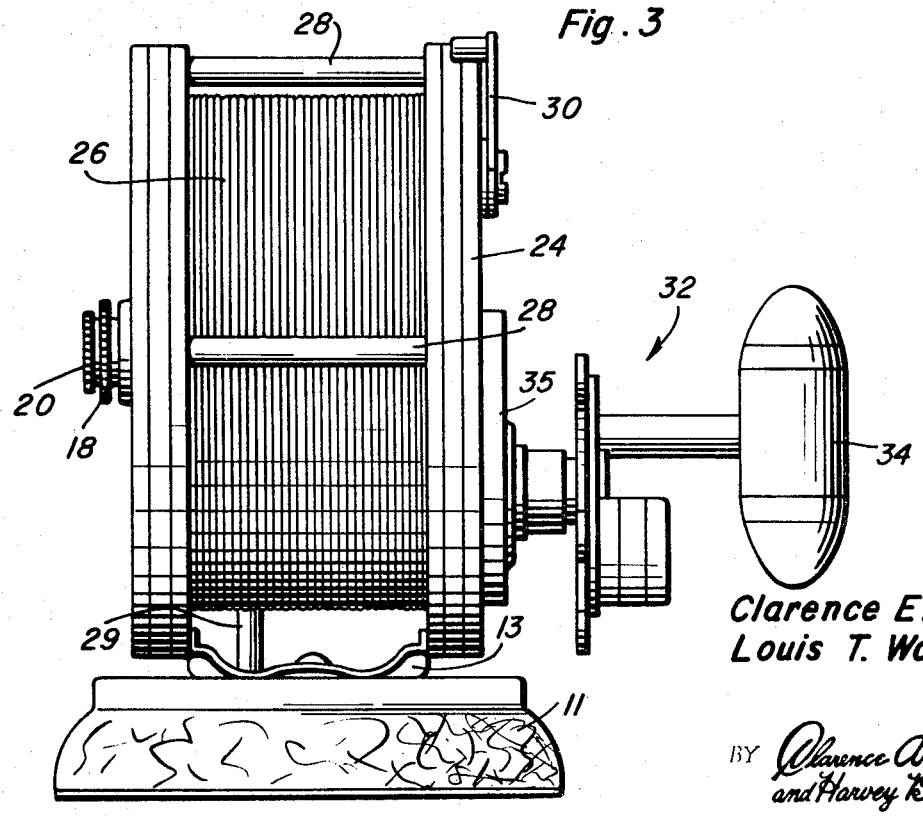

ALARM DEVICE UTILIZING FISHING REEL RATCHET MECHANISM

The present invention is related generally to alarm clocks, and more particularly to a decorative alarm clock which not only looks much like a fishing reel but has an alarm which sounds like a fishing reel.

Previously alarm clocks have been produced, which for the most part create the very disturbing conventional alarm sound, and are not decorative in appearance.

It is an object of the present invention to provide an alarm clock device which is not only decorative in appearance but produces a distinctive alarm sound.

It is a further object of the present invention to provide an alarm clock which includes components of an actual fishing reel and produces a clicking-like alarm sound normally associated with the reel when a fish bites.

It is still another object to provide an alarm clock enclosed in a fishing reel housing where the reel release lever acts as on-off alarm switch and the reel wind lever can be used to wind the alarm mechanism drive spring.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 illustrates the rear view of the alarm clock device shown in FIG. 1.

FIG. 3 is a side view of the alarm clock device of FIG. 1.

Figure 1:
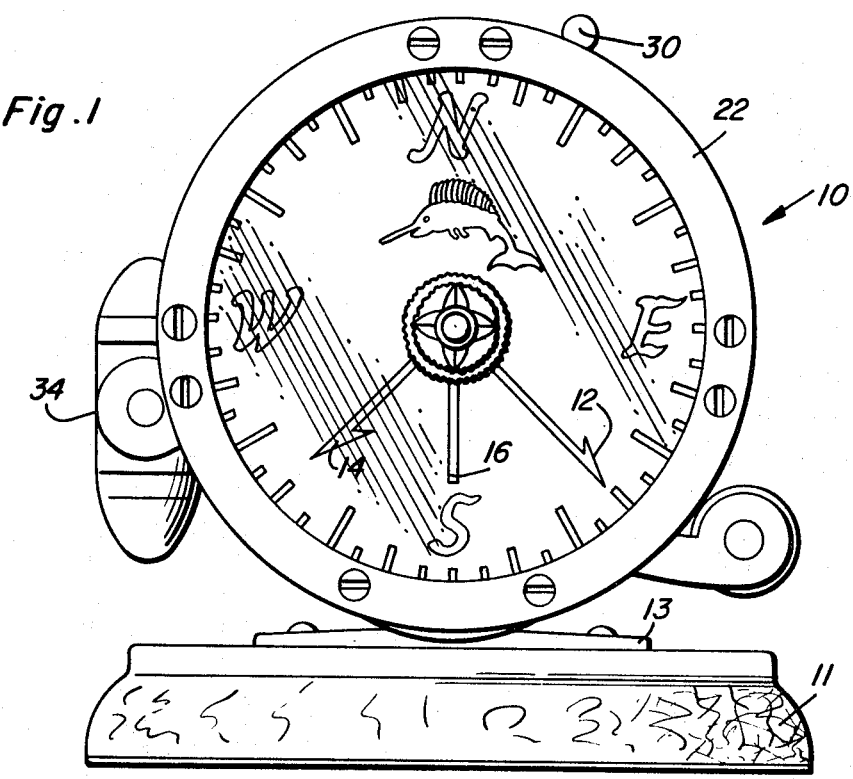
FIG. 1 illustrates the front view of the alarm clock device.

Referring specifically to the drawings, FIG. 1 shows a front view of the alarm clock device generally indicated by numeral 10. The clock is mounted on a base 11 made of walnut or other suitable materials and has a face which is set off in the form of compass headings of North, East, South and West with markings generally associated with clock reading around the circumference. In addition, the clock is provided with a minute hand 12, an hour hand 14, and an alarm set hand 16. The positions of the hour and minute hands may be made by rotation of knob 18 shown in FIG. 3 by way of a conventional internal mechanism not shown. Similarly, the alarm position may be adjusted by knob 20 which is also connected through an internal mechanism. The clock 10 is attached to base 11 by way of a mounting bracket 13 such as that associated with an actual fishing reel. The internal clock mechanism, not shown, may be of the conventional windup, battery or electric type. The clock mechanism is mounted inside of a housing made of several components of an ocean fishing reel including a front bracket 22 and rear bracket 24 which are mounted on either side of a thin wall spool portion 26 which may be covered with a layer of fishing line, as shown, to produce the appearance of an actual fishing reel. A plurality of support members 28 are sandwiched between the front and rear brackets as on an actual fishing reel. A conduit 29 is provided to accommodate electric leads when an electric clock mechanism is used.

The back of the clock is provided with a rotatable winding lever assembly generally indicated by numeral 32. In the preferred embodiment, the winding lever assembly is a component of an actual fishing reel and has a pivotally mounted handle member 34 which may be used to rotate the assembly. The assembly may be connected with a conventional mechanism in housing 35 to windup alarm spring 44.

Figure 4:
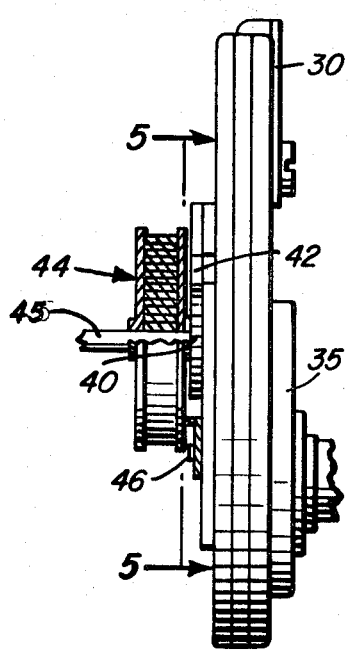
FIG. 4 is a partial cross-sectional side view of the alarm mechanism mounted on the alarm clock back.
Figure 5:
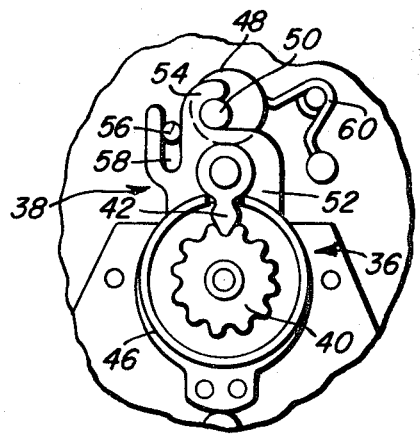
FIG. 5 shows the alarm mechanism in a view taken along plane 5 of FIG. 4.

An alarm on-off lever 30 is pivotally mounted on the back for movement between the "on" and "off" positions as shown in FIG. 2. Referring to FIGS. 4 and 5, alarm lever 30 is connected to the alarm sound making assembly 36 by way of slide mechanism 38. The alarm assembly 36 includes a rotatable gear or notched member 40 which as a plurality of teeth which engage a pivoted clicker arm 42. Clicker arm 42 is biased to the center position by a circular-shaped clicker spring 46 which engages indented side portions of clicker arm 42. As gear 40 is rotated, the intermittent engagement of clicker arm 42 against the gear teeth produces a clicking-like sound generally associated with the catching of a fish. The gear 40 is driven by a spring 44 of the type commonly found in windup alarm clocks. In the preferred embodiment, the alarm assembly 46 is comprised of components of an actual fishing reel.

FIG. 5 shows the alarm assembly with the alarm lever in the "on" position. The alarm lever 30 is connected to shaft 48 having a pin 50 eccentric to or offset from its center axis. A sliding carrier plate 52 is slidably mounted to the back portion of the housing and has an arcuate finger portion 54 which extends partially around offset pin 50. A guide 56 attached to the back of the housing engages slot 58 in carrier plate 52. Thus, as alarm lever 30 is moved toward the "off" position, pin 50 is rotated in the clockwise direction raising carrier plate 52 upward until clicker arm 42 disengages gear 40. The carrier plate 52 is guided in the vertical direction by guide and slot arrangement 56 and 58. Shaft 48 includes a pair of flats or other detent means, not shown, which engage locking spring 60 to hold it in either "on" or "off" position. In addition to disengaging clicker arm 42 from gear 40, movement of alarm lever 30 to the "off" position also disenables the alarm mechanism, such that spring 44 will not unwind to rotate gear 40 when the clock reaches the alarm time. This may be through axial movement of shaft 45 when the lever is moved to the "off" position, such movement being well known in the art and often used in conventional wind-up alarm mechanisms.

It will be appreciated that the clicker alarm assembly can be used with a variety of click mechanisms, and still produce the desired click-like sound. Furthermore, it should be noted that the gear 40 can be driven by a variety of conventional alarm mechanisms, spring drive 44 being illustrative of one preferred embodiment only. It will also be appreciated that the alarm lever has the appearance of an actual fishing reel release lever, yet provides a convenient "on-off" alarm switch. Thus, the present invention provides both functional and decorative alarm clock device which may be conveniently set and adjusted to achieve the desired timing results.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a clock mechanism, an alarm device comprising a slidably mounted carrier plate, a release lever operatively connected to said carrier plate for selective movement thereof between on and off positions, a rotatably mounted gear with a plurality of teeth thereon, a clicker arm pivotally mounted to said carrier plate and normally engaging said teeth when said carrier plate is in said on position, and means for biasing said clicker arm to a center position when said gear rotates to produce a click-like sound, said biasing means including a circular-shaped resilient spring with an opening therein, said clicker arm extending through said opening and intermittently engaging said spring as said gear is rotated.

2. The combination of claim 1 wherein said alarm device includes a pivotally mounted shaft rigidly connected to said release lever and having an offset pin thereon, said carrier plate having an arcuate finger extending partially around said pin to move said carrier plate in the vertical direction when said release lever is moved from the on position to the off position.

3. In combination with a clock mechanism, an alarm device comprising means for producing click-like sounds of sufficient intensity to be easily audible beyond the immediate vicinity of the clock mechanism, said sound producing means including a gear rotatably mounted for rotation about a first axis and including a plurality of radially extending teeth thereon, a slidably mounted carrier plate movable between on and off positions, a clicker arm mounted to said carrier plate for pivotal movement about a second axis and including a tapered end portion normally positioned between a pair of said gear teeth when said carrier plate is in said on position, said end portion intersecting a plane defined by said first and second axes, and means for biasing said clicker arm to pivotally influence said end portion toward said normal position, said end portion being remote from said gear teeth when said carrier plate is moved to said off position.

4. The combination set forth in claim 3 wherein said biasing means includes a spring member influencing the end portion of said clicker arm in a direction generally tangential to said gear.

* * * * *